United States Patent [19]

Ward

[11] Patent Number: 5,656,566

[45] Date of Patent: Aug. 12, 1997

[54] CATALYSTS

[75] Inventor: Andrew Mark Ward, Stockton-on-Tees, United Kingdom

[73] Assignee: Imperial Chemical Industries PLC, United Kingdom

[21] Appl. No.: 417,877

[22] Filed: Apr. 6, 1995

[30] Foreign Application Priority Data

Apr. 15, 1994 [GB] United Kingdom .................. 9407512

[51] Int. Cl.⁶ .................. B01J 23/86; B01J 23/26
[52] U.S. Cl. .................. 502/316; 502/319; 502/336; 502/338
[58] Field of Search .................. 502/313, 314, 502/316, 317, 319, 332, 336, 338

[56] References Cited

U.S. PATENT DOCUMENTS

| | | | |
|---|---|---|---|
| 3,965,046 | 6/1976 | Deffeyes | 252/472 |
| 4,046,073 | 12/1977 | Pomot | 252/465 |
| 4,064,073 | 12/1977 | Pomot | 252/465 |
| 4,404,254 | 9/1983 | Franz et al. | 428/329 |
| 4,459,276 | 7/1984 | Nobuoka et al. | 423/633 |
| 4,499,203 | 2/1985 | Dupin . | |
| 4,598,062 | 7/1986 | Schneider et al. | 502/306 |
| 4,861,745 | 8/1989 | Huang . | |
| 5,037,795 | 8/1991 | Wieserman et al. | 502/401 |
| 5,055,288 | 10/1991 | Lewis et al. | 424/9 |

*Primary Examiner*—Glenn A. Caldarola
*Assistant Examiner*—Alexander G. Ghyka

[57] ABSTRACT

Catalyst precursor pellets, suitable for use, after reduction, as high temperature shift catalysts, comprising oxides of iron and chromium and including particles having an aspect ratio of at least 2 and an average (by weight) maximum dimension of at least 500 nm. The particles are preferably acicular and particularly are acicular iron oxide, alumina, or zinc oxide particles.

10 Claims, No Drawings

CATALYSTS

This invention relates to catalysts and in particular to iron oxide/chromia catalysts, and precursors thereof, for use for the shift reaction, i.e. the reaction of carbon monoxide and steam to produce carbon dioxide and hydrogen.

Iron oxide/chromia shift catalysts are conventionally made by precipitation of iron and chromium compounds (that decompose to the oxides upon heating) from a solution of iron and chromium salts by the addition of a suitable alkaline reactant, e.g. sodium hydroxide or carbonate. The resulting precipitate is then washed, dried, and calcined and tableted to form catalyst precursor pellets. Prior to use for the shift reaction, the pellets are subjected to reduction conditions wherein the iron oxide is reduced to magnetite ($Fe_3O_4$) and any chromium trioxide present reduced to the sesquioxide, chromia ($Cr_2O_3$). This reduction is often carried out in the reactor wherein the shift reaction is to be effected.

We have found that the activity of the catalyst may be significantly increased by incorporating into the catalyst precursor particles of aspect ratio of at least 2 and a maximum dimension of at least 5000 Å (500 nm), and preferably less than 15000 Å (1500 nm).

Accordingly the present invention provides catalyst precursor pellets comprising oxides of iron and chromium and including particles having an aspect ratio of at least 2 and an average (by weight) maximum dimension of at least 500 nm.

The particles preferably have an average length in the range 600 to 1500 nm: the activity advantage given by the invention decreases if longer particles are employed.

By the term aspect ratio we mean the ratio between the maximum dimension and the minimum dimension of the particles. The particles may thus be plate-like where the length and breadth are at least twice the thickness. Alternatively, and preferably, the particles are acicular, wherein the average length is at least twice, preferably at least 2.5 times, the breadth, e.g having a "rod" configuration wherein the cross sectional dimensions, i.e. breadth and thickness are approximately equal, or a "lath" configuration, wherein the thickness is significantly less than the breadth.

In the conventional production route for iron oxide/chromia catalysts, the solution of the iron and chromium salts used in the precipitation is often a solution of sulphates. The iron and chromium compounds resulting from the precipitation from such a sulphates solution is often in the form of small acicular crystals, of average length below 500 nm, typically up to about 300 nm. As a result of the need to minimise the amount of sulphur in the final catalyst, extensive washing of the precipitate is often necessary: furthermore, precipitation from sulphates solution often gives rise to a significant proportion of the chromium in hexavalent form in the final catalyst precursor. Not only are hexavalent chromium compounds toxic, thus presenting handling problems, but they give rise to considerable exotherms upon the subsequent reduction of the catalyst precursor. For these reasons, precipitation of the iron and chromium compounds from a solution of iron and chromium nitrates is preferable: as described in U.S. Pat. No. 4,305,846, this not only avoids the introduction of sulphur compounds, but also minimises the amount of hexavalent chromium compounds in the catalyst precursor. However, in contrast to the small acicular crystals formed when using a sulphates solution, the nitrates solution tends to provide the precipitates in the form of an amorphous gel structure.

We have found that suitable precursors can be produced by effecting the precipitation of iron and chromium compounds in the presence of the particles having an aspect ratio of at least 2 and an average length within the range 500 to 1500 nm. Thus particles having the desired structure may be slurried into the solution of the base used to effect the precipitation. While a solution of iron and chromium sulphates may be used for the precipitation, it is preferred to employ a solution of the nitrates. Alternatively, but less preferably, the particles may be mixed with the precipitated iron and chromium compounds before calcination thereof.

The particles having an aspect ratio of at least 2 may be of iron oxide or of any suitable material, such as alumina or zinc oxide, that is inert under the conditions of use of the catalyst. In particular there may be used acicular alumina particles, e.g. acicular boehmite, or, preferably, acicular iron oxide, or oxyhydroxide, particles, e.g. acicular haematite or goethite particles. Alternatively suitable plate-like iron oxide particles may be made by rapidly oxidising ferrous hydroxide. Plate-like aluminium monohydrate (boehmite) particles may also be used. The particles preferably have a BET surface area of at least 5 $m^2$/g, and in particular in the range 8 to 20 $m^2$/g. Where the particles are present during the precipitation stage, at least some of the iron and chromium appears to be precipitated as a coating of the iron and chromium compounds on the particles.

The precursor preferably has an iron oxide content (expressed as $Fe_2O_3$) of 60 to 95% by weight. Preferably the iron to chromium atomic ratio in the precursor is in the range 6 to 20, particularly 8 to 12. The precursor may contain oxides of other metals, eg aluminium, manganese, or, especially, copper. Particularly preferred precursors have an iron to copper atomic ratio of 10:1 to 100:1. Such additional oxides may be introduced by coprecipitation of suitable metal compounds that decompose upon heating to the oxides with the iron and chromium compounds. Alternatively, or additionally, such additional oxides may be incorporated by effecting the precipitation of the iron and chromium compounds in the presence of the desired additional oxides or compounds that decompose to the oxides upon heating. Alternatively, such oxides, or compounds that decompose thereto upon heating, may be added to the precipitated iron and chromium compounds before calcination and shaping into the desired pellets. Alternatively, the precipitated iron and chromium compounds, before or after calcination and forming the shaped pellets, may be impregnated with a solution of compounds that decompose upon heating to the desired additional oxides.

The particles of aspect ratio at least 2 preferably form 2 to 40%, particularly 5 to 30%, by weight of the total weight of the calcined precursor. Where the particles are of a material, e.g. alumina, that does not exert any significant catalytic activity, the particles act as a diluent and so it is preferred that they form less than 20% by weight of the calcined precursor. It is also believed that, even when the particles used in the production of the precursor are iron oxide particles, they exhibit little catalytic activity themselves. The particles are believed to modify advantageously the pore structure of the catalyst obtained by reduction of the precursor, enabling more ready access of the reactants to the catalytically active sites in the catalyst pellets.

As indicated above, after forming the composition containing precipitated iron and chromium compounds and the particles, having an aspect ratio of at least 2, the composition is calcined to convert the precipitated iron and chromium compounds to oxides and then is tableted into suitably sized pellets. Such pellets generally have a maximum and minimum dimensions in the range 2 to 15 mm.

The catalyst pellets formed by the reduction of the precursor pellets are particularly of use for the high temperature shift reaction wherein a feed gas containing carbon monoxide and steam, and often other components such as hydrogen, carbon dioxide, methane, nitrogen, and/or argon, is passed through a bed of the catalyst pellets at an inlet temperature above about 300° C., and usually in the range 300°–370° C. at a pressure, usually in the range from atmospheric to 100 bar abs. The shift reaction is exothermic, and so unless means are provided to effect cooling of the gas as it passes through the catalyst bed, the exit temperature is usually in the range 370°–450° C.

The invention is illustrated by the following examples. In these examples, acicular particles were used. The nature and BET surface area of the acicular particles used is set out in the following Table I.

TABLE I

| | Composition | form | average length (nm) | width (nm) | BET surface area (m²/g) |
|---|---|---|---|---|---|
| A | Haematite | rods | 900 | 70–150 | 9.4 |
| B | Haematite | rods | 1200 | 200–400 | 3.8 |
| C | Goethite | laths | 700 | 100–200 | 15.8 |
| D | Goethite | laths | * | * | 16.4 |
| E | Goethite | laths | 700 | 100–200 | 18.8 |

*not determined, but believed to be similar to C and E.

EXAMPLE 1 (comparative)

A solution containing iron, chromium, and copper nitrates in the atomic proportions of 90 Fe:8 Cr:2 Cu and having a total metals concentration of about 2M, was added to a near saturated solution of sodium carbonate while continuously stirring and maintaining the temperature at about 60° C. to precipitate iron, chromium, and copper compounds. Addition of the metals solution was stopped when the pH was about 2.5–3.0. While continuing stirring the slurry was allowed to de-gas and then the pH adjusted to 7.0. The precipitate was filtered off and washed until the sodium content (expressed as $Na_2O$) was below 0.2% by weight. The precipitate was then dried and calcined in air at 150° C. to decompose the iron, chromium, and copper compounds to the respective oxides. The composition was then tableted into cylindrical catalyst precursor pellets of 5.4 mm diameter and 3.6 mm height of particle density about 2.0 g/cm³.

The activity of the catalyst formed by reduction of the precursor was determined by charging about 17 ml of the pellets to a tubular isothermal reactor of internal diameter 27 mm. The precursor was reduced by passing a mixture of equal volumes of process gas and steam through the reactor at a flow rate of 1350 l/hr while increasing the temperature to 400° C. The process gas had the following composition (% by volume):

| | |
|---|---|
| carbon monoxide | 14 |
| carbon dioxide | 6.25 |
| nitrogen | 25.5 |
| hydrogen | 53 |
| methane | 1.25 |

To assess the activity of the resultant catalyst, a mixture of 2 volumes of the above process gas and one volume of steam was then passed through the catalyst sample and the outlet gas analysed. The flow rate was varied until the composition of the outlet gas indicated that a specified proportion of carbon monoxide had been converted. The procedure was effected at two temperatures, viz 365° C. and 435° C., to simulate typical shift reactor inlet and outlet temperatures.

EXAMPLE 2–9

The procedure of Example 1 was repeated except that acicular iron oxide particles were added to the sodium carbonate solution to form a slurry before addition of the mixed metals nitrates solution. The amounts of the acicular particles used were such that the weight of added acicular particles amounted to the percentage of the calcined precursor quoted in Table II below. The activity was determined by reducing the precursor and testing it as in Example 1. As a comparison of the activities at the two temperatures, in Table II the ratios of the observed flow rates to those of Example 1 at the respective temperatures are quoted.

EXAMPLE 10

The procedure of Example 2 was repeated except that the acicular material was added after precipitation of the iron, chromium, and copper compounds, but before de-gassing of the precipitate slurry.

EXAMPLES 11–12 (comparative)

Pelleted commercially available iron oxide/chromium oxide/copper oxide high temperature shift catalyst precursors having a similar composition to the precursors of Example 1 but in which the iron oxide was present as small acicular crystals of average length 150 nm (Example 11) and 300 nm (Example 12), possibly as a result of precipitation from a sulphates solution, were reduced and activity tested as in Example 1.

From the following Table II it is seen that the catalysts of the invention, Examples 2–10, all exhibited an increased activity compared to the acicular material-free catalyst of Example 1 and compared to the catalysts of Examples 11 and 12 where the iron oxide was present as small acicular crystals. Whereas the BET surface area of the acicular material-free catalysts of Example 1 (as measured on the catalyst discharged from the activity test), was 16.8 m²/g, the BET surface areas of the catalysts according to the invention, likewise measured on samples of the catalyst discharged from the activity test, were lower, thus indicating that the increase in activity was not a result of an increase in the BET surface area of the catalyst.

The crush strength of a number of catalyst pellets discharged from the activity test of Examples 1, 2, 5, 6, and 9 was determined by measuring the load, applied to the curved surface of the cylindrical pellets, required to crush the pellet. The crush strength is taken to be the average of the load required for the individual pellets tested of that catalyst sample. In Table II the average strength of the sample is quoted relative to that of the Example 1 pellets. It is seen that the incorporation of the acicular particles gave a significant increase in strength.

No advantage of improved activity was observed when acicular particles were analogously incorporated into copper oxide/zinc oxide/alumina low temperature shift catalyst precursors.

TABLE II

| | Acicular material | | Relative flow rate | | BET surface | Relative crush |
|---|---|---|---|---|---|---|
| Ex. | type | weight⁺ (%) | 365° C. | 435° C. | area* (m²/g) | strength* |
| 1 | — | — | 1.00 | 1.00 | 16.8 | 1.0 |
| 2 | A | 16.4 | 1.39 | 1.45 | 12.6 | 1.8 |

TABLE II-continued

| | Acicular material | | Relative flow rate | | BET surface | Relative crush |
|---|---|---|---|---|---|---|
| Ex. | type | weight+ (%) | 365° C. | 435° C. | area* (m²/g) | strength* |
| 3 | A | 11.4 | 1.20 | 1.28 | 14.3 | — |
| 4 | A | 38.4 | 0.99 | 1.12 | 14.9 | — |
| 5 | B | 20.7 | 1.19 | 1.22 | 14.4 | 1.2 |
| 6 | C | 11.3 | 1.26 | 1.43 | 14.8 | 1.9 |
| 7 | D | 12 | 1.23 | 1.24 | 11.8 | — |
| 8 | D | 29.9 | 1.22 | 1.30 | 13.5 | — |
| 9 | E | 16.3 | 1.20 | 1.42 | 13.1 | 1.9 |
| 10 | A | 20.4 | 1.08 | 1.15 | — | — |
| 11 | — | — | 0.94 | 0.98 | — | — |
| 12 | — | — | 0.88 | 0.77 | — | — |

+based on weight of calcined precursor
*of discharged catalyst.

I claim:

1. A catalyst precursor comprising oxides of iron and chromium and including particles having an aspect ratio of at least 2 and an average (by weight) maximum dimension in the range of 500 to 1500 nm, said precursor being in the form of pellets having minimum and maximum dimensions in the range of 2 to 15 mm.

2. Catalyst precursor pellets having an iron oxide content (expressed as $Fe_2O_2$) of 60 to 95% by weight formed from a composition comprising oxides of iron and chromium, said composition including particles having an aspect ratio of at least 2 and an average (by weight) maximum dimension in the range of 500 to 1500 nm, said particles forming 2 to 40% by weight of the catalyst precursor pellets.

3. A process for the production of a catalyst precursor comprising precipitating iron and chromium compounds in the presence of acicular particles having an average length within the range of 500 to 1500 nm, calcining the resultant precipitate, and forming the calcined precipitate into pellets having minimum and maximum dimensions in the range of 2 to 15 mm.

4. A catalyst precursor according to claim 1 wherein the particles are selected from alumina, alumina monohydrate, zinc oxide, iron oxide, and iron oxyhydroxide particles.

5. A catalyst precursor according to claim 1 wherein the particles are acicular.

6. A catalyst precursor according to claim 1 having an iron oxide content (expressed as $Fe_2O_3$) of 60 to 95% by weight.

7. A catalyst precursor according to claim 1 having an iron to chromium atomic ratio in the range 6 to 20.

8. A catalyst precursor according to claim 1 containing oxides of metals selected from aluminium, manganese, and copper.

9. A catalyst precursor according to claim 1 containing copper oxide and having an iron to copper atomic ratio of 10:1 to 100:1.

10. A catalyst precursor according to claim 1 containing 2 to 40% by weight of the acicular particles.

* * * * *